(12) United States Patent
Wang et al.

(10) Patent No.: US 10,517,106 B1
(45) Date of Patent: Dec. 24, 2019

(54) SYSTEMS, METHODS, AND DEVICES FOR NETWORK REQUEST SCHEDULING

(71) Applicant: Cypress Semiconductor Corporation, San Jose, CA (US)

(72) Inventors: Xianmin Wang, Westfield, NJ (US); Rajendra Kumar Gundu Rao, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/455,271

(22) Filed: Jun. 27, 2019

Related U.S. Application Data

(60) Provisional application No. 62/854,450, filed on May 30, 2019.

(51) Int. Cl.
*H04W 72/12* (2009.01)
*H04W 72/04* (2009.01)
*H04W 84/12* (2009.01)

(52) U.S. Cl.
CPC ....... *H04W 72/12* (2013.01); *H04W 72/0446* (2013.01); *H04W 84/12* (2013.01)

(58) Field of Classification Search
CPC . H04W 72/12; H04W 72/0446; H04W 84/12; H04W 72/044
See application file for complete search history.

(56) References Cited

U.S. PATENT DOCUMENTS

| | | | |
|---|---|---|---|
| 7,502,358 B1 | 3/2009 | Kopikare et al. | |
| 7,590,079 B2 | 9/2009 | Smavatkul et al. | |
| 7,603,146 B2 | 10/2009 | Benveniste | |
| 9,276,699 B2 | 3/2016 | Wu et al. | |
| 9,713,087 B2 | 7/2017 | Asterjadhi et al. | |
| 10,264,544 B1 | 4/2019 | Chu et al. | |
| 2002/0095221 A1* | 7/2002 | Cook | G05B 9/03 700/4 |

(Continued)

FOREIGN PATENT DOCUMENTS

WO     2017119759 A1    7/2017

OTHER PUBLICATIONS

Mur, Daniel Camps, "Contributions to QoS and Energy Efficiency in Wi-Fi Networks," Polytechnic University of Catalonia, Sep. 2011, pp. 1-227; 227 pages.

(Continued)

*Primary Examiner* — Jenee Holland

(57) ABSTRACT

Systems, methods, and devices schedule requests associated with wireless communications devices. Methods include receiving a plurality of requests from a plurality of wireless communications devices that is compatible with an 802.11 transmission protocol, where each request of the plurality of requests includes a proposed service period and proposed service interval. Methods further include generating, using a processing device, a plurality of quantization factors by quantizing the proposed service interval included in each of the plurality of requests, determining, using the processing device, a common service interval based, at least in part, on the plurality of quantization factors and a basic service unit, and generating, using the processing device, an allocation pattern to allocate the proposed service periods within the common service interval.

20 Claims, 9 Drawing Sheets

(56) References Cited

U.S. PATENT DOCUMENTS

| | | | | |
|---|---|---|---|---|
| 2008/0186893 A1* | 8/2008 | Kolding | H04W 52/0235 | 370/311 |
| 2011/0239011 A1* | 9/2011 | Waris | H04W 4/38 | 713/310 |
| 2012/0155279 A1* | 6/2012 | Ho | H04L 47/522 | 370/241 |
| 2013/0028293 A1* | 1/2013 | Makh | H04W 48/12 | 375/132 |
| 2013/0076500 A1* | 3/2013 | Yu | B60C 23/0457 | 340/445 |
| 2013/0188541 A1* | 7/2013 | Fischer | H04W 72/06 | 370/311 |
| 2014/0057655 A1* | 2/2014 | Lee | G01S 13/74 | 455/456.1 |
| 2014/0112226 A1* | 4/2014 | Jafarian | H04W 52/0229 | 370/311 |
| 2014/0153464 A1* | 6/2014 | Emeott | H04W 52/0206 | 370/311 |
| 2014/0153512 A1* | 6/2014 | Koskela | H04L 1/00 | 370/329 |
| 2014/0171056 A1* | 6/2014 | Jafarian | H04W 52/0216 | 455/418 |
| 2014/0177604 A1* | 6/2014 | Lee | H04W 52/0212 | 370/336 |
| 2014/0192694 A1* | 7/2014 | Pantelidou | H04W 52/0216 | 370/311 |
| 2014/0241257 A1* | 8/2014 | Ding | H04W 48/08 | 370/329 |
| 2014/0321436 A1* | 10/2014 | Kwon | H04L 5/0085 | 370/336 |
| 2015/0195849 A1* | 7/2015 | Bashar | H04W 16/14 | 370/330 |
| 2015/0323984 A1* | 11/2015 | Ganton | G06F 1/28 | 713/323 |
| 2015/0327262 A1* | 11/2015 | Kwon | H04W 72/1289 | 370/329 |
| 2015/0351125 A1* | 12/2015 | Kwon | H04W 74/002 | 370/336 |
| 2015/0365940 A1* | 12/2015 | Chu | H04B 7/0452 | 370/329 |
| 2016/0100361 A1* | 4/2016 | Zheng | H04W 52/0216 | 455/522 |
| 2016/0105829 A1* | 4/2016 | Wentink | H04W 8/005 | 370/338 |
| 2016/0165574 A1* | 6/2016 | Chu | H04L 5/0007 | 370/312 |
| 2016/0179176 A1* | 6/2016 | Kohara | G06F 1/3237 | 713/322 |
| 2016/0219510 A1* | 7/2016 | Asterjadhi | H04W 52/0274 | |
| 2016/0219512 A1* | 7/2016 | Asterjadhi | H04W 52/0274 | |
| 2016/0219522 A1* | 7/2016 | Asterjadhi | H04W 52/0274 | |
| 2016/0269993 A1* | 9/2016 | Ghosh | H04W 52/0229 | |
| 2017/0071022 A1* | 3/2017 | Sampath | H04W 48/18 | |
| 2017/0164387 A1 | 6/2017 | Lou et al. | | |
| 2017/0195954 A1* | 7/2017 | Ghosh | H04W 52/0216 | |
| 2017/0265130 A1* | 9/2017 | Kakani | H04W 48/10 | |
| 2017/0280388 A1* | 9/2017 | Asterjadhi | H04W 72/1284 | |
| 2017/0310424 A1 | 10/2017 | Chun et al. | | |
| 2017/0311258 A1* | 10/2017 | Asterjadhi | H04W 52/0274 | |
| 2017/0332385 A1 | 11/2017 | Shirali et al. | | |
| 2017/0339680 A1* | 11/2017 | Jia | H04W 28/02 | |
| 2017/0347372 A1* | 11/2017 | Li | H04W 72/1284 | |
| 2018/0132178 A1* | 5/2018 | Park | H04W 52/0216 | |
| 2018/0212738 A1 | 7/2018 | Chun et al. | | |
| 2018/0295573 A1 | 10/2018 | Gidvani et al. | | |
| 2019/0021055 A1* | 1/2019 | Guo | H04L 43/10 | |
| 2019/0037506 A1* | 1/2019 | Singh | H04W 76/10 | |
| 2019/0083003 A1* | 3/2019 | Lee | A61B 5/113 | |
| 2019/0174410 A1* | 6/2019 | Seok | H04W 72/04 | |
| 2019/0182774 A1* | 6/2019 | Jain | H04W 52/0235 | |

OTHER PUBLICATIONS

International Search Report for International Application No. PCT/US19/56227 dated Nov. 12, 2019; 2 pages.

Written Opinion of the International Searching Authority for International Application No. PCT/US19/56227 dated Nov. 12, 2019; 3 pages.

* cited by examiner

SYSTEMS, METHODS, AND DEVICES FOR NETWORK REQUEST SCHEDULING

CROSS-REFERENCE TO RELATED APPLICATIONS

This application claims the benefit under 35 U.S.C. § 119(e) of US Provisional Patent Application No. 62/854,450, filed on May 30, 2019, which is incorporated by reference herein in its entirety for all purposes.

TECHNICAL FIELD

This disclosure generally relates to direct current wireless communications requests, and more specifically, to the scheduling of such wireless communications requests.

BACKGROUND

Wireless communications devices may communicate with each other via one or more communications modalities, such as a WiFi connection. Accordingly, such wireless communication may be implemented in a manner compliant with a wireless communication protocol. Moreover, such wireless communications devices may be configured as access points and stations in which an access point broadcasts network traffic to downstream stations, and handles requests received from such stations. An access point may be in communication with multiple stations and may have to handle multiple requests from such stations in tandem. Conventional techniques for handling such requests remain limited because in situations where many stations are in communication with a single access point, the access point might not be able to handle all of their requests concurrently.

DETAILED DESCRIPTION

Figure 1:
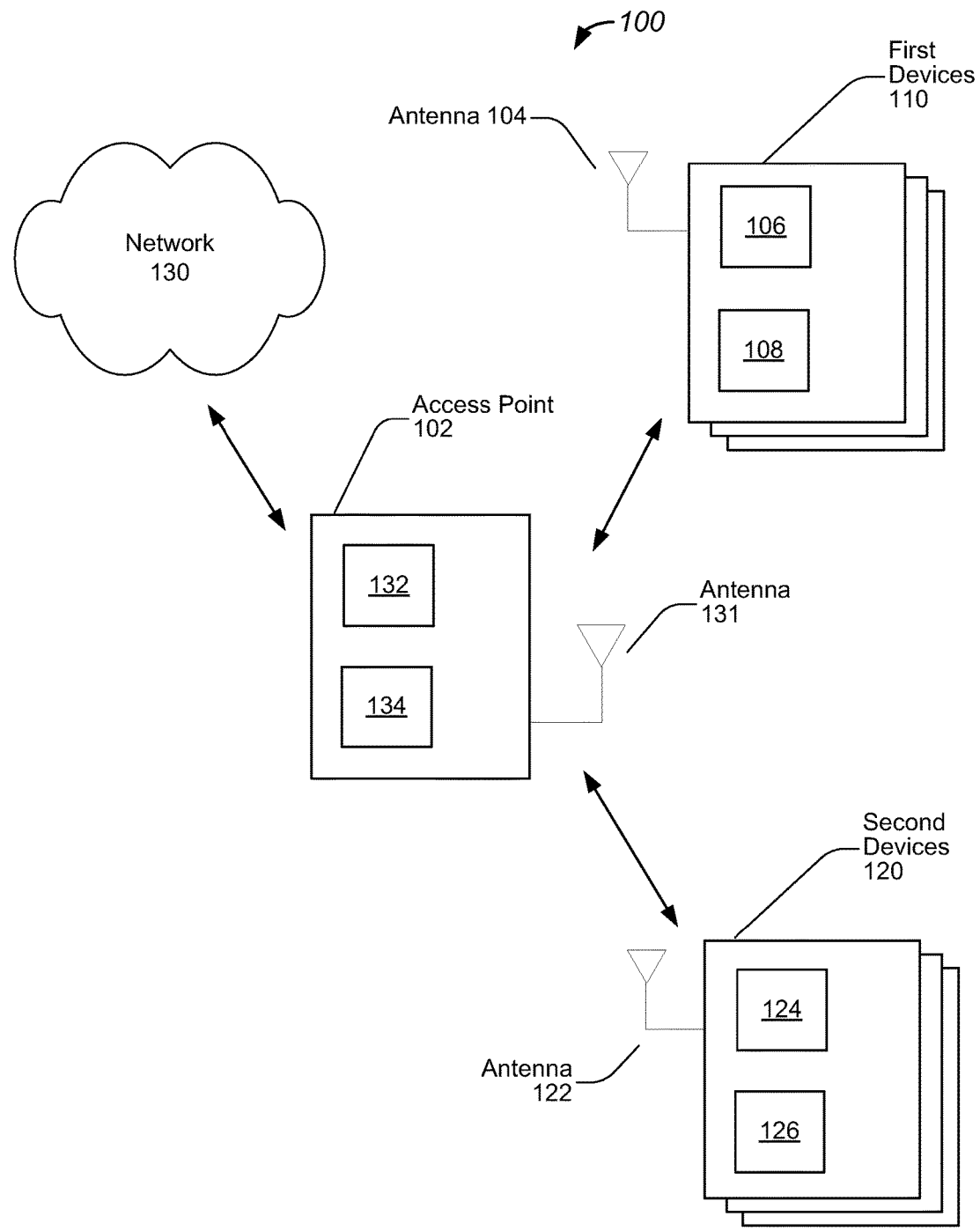
FIG. 1 illustrates a diagram of an example of a system for scheduling requests, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless communications devices may include access points and stations that communicate with each other via wireless communications modalities, such as WiFi communications links. For example, in the context of the Internet of things (IoT), there may be many wireless communications devices in communication with each other. In such situations, the access point and each station may communicate with each other in a manner compatible with a wireless transmission protocol, such as a WiFi protocol. In one example, target wake time (TWT) scheduling may be used by the access point to schedule network traffic associated with each station. By using TWT scheduling, each station may negotiate a pre-specified wake-up period with the access point for data transmission. Also specified are sleep times in which the station is in an energy saving mode and is not involved in data transmission. To ensure Quality-of-Service (QoS) of data transmission, each TWT session typically includes two parameters: a service interval (SI) and a service period (SP). The SI is a time-domain interval between the start of two adjacent wake times at a station. The SP is a time period of a wake-up during which data transmission at the station occurs.

As described above, an access point may be in communication with multiple stations, and to handle each of their TWT requests, the access point may implement a time division multiplexing (TDM) scheduling algorithm to ensure that SPs of all admitted TWT requests are scheduled free of overlapping in time domain. However, the SI and SP of each TWT request are often determined, at least in part, based on data traffic requirements of the stations, and the SIs might not be easily related to each other as the SIs from different stations may be quite different. Accordingly, conventional techniques remain limited in their ability to schedule periodic TWT requests in a manner that is contention-free. Furthermore, in such situations, the access point might not be able to reliably and consistently schedule network traffic for all stations, and may not be able to ensure a satisfactory QoS for each station.

Disclosed herein are systems, methods, and devices for scheduling requests associated with multiple stations. As will be discussed in greater detail below, systems may include an access point in communication with various stations. The access point may be configured to handle many different requests form the various stations by establishing a common service interval, converting parameters of the requests to the common service interval, and allocating the requests within the common service interval by generating a new or modifying an existing allocation pattern. As will also be discussed in greater detail below, additional features may be implemented to further enhance the ability to accommodate many stations. For example, one or more constraints may be applied to the parameters, and various implementations of grouping and sub-grouping may be implemented to facilitate the generation and implementation of the allocation pattern.

FIG. 1 illustrates a diagram of an example of a system for scheduling requests, configured in accordance with some embodiments. As discussed above, various wireless communications devices may be configured as stations, and may also be configured as access points. In various embodiments, the access point is configured to establish and manage connections between the stations and a network. As will be discussed in greater detail below, the access point may be configured to implement one or more novel scheduling techniques to utilize the available communications medium in a manner that accommodates wireless traffic among all of the devices while ensuring that an appropriate QoS is provided to all such devices.

In various embodiments, system 100 may include first devices 110 which may be wireless communications devices that are configured as stations. Such wireless communications devices may be a smart device, such as those found in wearable devices, or may be a monitoring device, such as those found in smart buildings, environmental monitoring, and energy management. It will be appreciated that such wireless communications devices may be any suitable device, such as those found in cars, other vehicles, and even medical implants. As discussed above, various wireless communications devices may be in communication with each other via one or more wireless communications mediums. As shown in FIG. 1, first devices 110 may each include an antenna, such as antenna 104. First devices 110 may also include processing device 108 as well as transceiver 106. As will be discussed in greater detail below, such processing devices, transceivers, and radios may be configured to generate and send TWT requests, which may include TWT frames and headers, to an access point, such as access point 102, and negotiate a TWT schedule with access point 102 in which a schedule of wake times and sleep times is determined for each of first devices 110. In various embodiments, first devices 110 may generate TWT request with service parameters that define service intervals and service periods of first devices 110. Accordingly, such first service parameters may be determined based on characteristics of first devices 110, such as types of devices, such as those discussed above, as well as various operational parameters of such types of devices and QoS requirements of such devices.

In some embodiments, system 100 may further include second devices 120 which may also be configured as stations. As similarly discussed above, second devices 120 may be smart devices or other devices, such as those found in cars, other vehicles, and medical implants. In various embodiments, second devices 120 may be different types of devices than first devices 110. Accordingly, access point 102 may be in communication with multiple different types of devices. As discussed above, each of second devices 120 may include an antenna, such as antenna 122, as well as processing device 126 and transceiver 124, which may be configured to negotiate TWT schedules with access point 102 in which schedules of wake times and sleep times are determined for each of second devices 120. As similarly discussed above, second devices 120 may have second service parameters that define service intervals and service periods of second devices 120. Such second service parameters may be determined based on characteristics of second devices 120, such as types of devices, such as those discussed above, as well as various operational parameters of such types of devices and QoS requirements of such devices.

System 100 further includes access point 102 which may be configured to manage communication between first devices 110 and second devices 120, and a communications network, such as network 130. Accordingly, access point 102 may include transceiver 132 and processing device 134, and may be configured to schedule network traffic of first devices 110 and second devices 120 to facilitate communication with other devices that may be coupled to network 130. As discussed above, access point 102 may be configured to communicate with first devices 110 and second devices 120 via a WiFi connection. In one example, access point 102 may be configured to communicate with first devices 110 and second devices 120 in a manner compatible with an 802.11ax specification.

As noted above, first devices 110 and second devices 120 may have different service parameters and different QoS requirements. In various embodiments, access point 102 is configured to determine a common service interval that may be utilized for all of first devices 110 and second devices 120 that will ensure that a QoS requirement is met for all of first devices 110 and second devices 120, and no overlapping of data transmission occurs. As will be discussed in greater detail below, access point 102 may be configured to convert the first service parameters and second service parameters into different format that are further used to establish a new parameter called common service interval for the access point 102. Access point 102 may then generate an allocation pattern that allocates, within the common service interval, the wake and sleep times associated with the received requests.

More specifically, a proposed service interval may be included in the service parameters of each request received from each of first devices 110 and second devices 120. These service intervals of the requests, which may be TWT requests, are divided by a designated time-domain quantization unit, which is referred to herein as a basic service unit (BSU). Accordingly, the received service intervals may be converted to an integer quantity such that periodicity of time division multiplexing (TDM) is not based on raw values, but is instead based on quantized integers of service intervals. After such service interval quantization, a common service interval may be determined such that the common service interval is of a sufficient size to accommodate the different service periods without overlapping in subsequent iterations, thus ensuring a QoS for each device. In some embodiments, the common service interval may be determined by taking the least common multiple of the quantized integer quantities of all of the service intervals. Once the common service interval has been determined, an allocation pattern may be generated to implement timeslot allocation for the TWT requests, such that all of the service periods of the requests are accommodated within one common service interval. In such an implementation, the same scheduling pattern will repeat for every common service interval. Accordingly, when such service periods are allocated free of overlapping within one common service interval, there will be no service period overlapping in subsequent common service intervals. In this way, the complexity of time division multiplexing (TDM) scheduling is reduced. Additional features, such as implementation of grouping, will be discussed in greater detail below with reference to FIGS. 4-7.

In various embodiments, access point 102 is a device that has been configured as an access point. More specifically, access point 102 may be a software enabled access point (SoftAP). Accordingly, the devices included in FIG. 1 may be configurable such that they can be configured as either an access point or a station, depending upon one or more settings. Therefore, while FIG. 1 illustrates one example of a configuration of system 100, it will be appreciated that first devices 110 and second devices 120 may also be configured as access points if appropriate.

Figure 2:
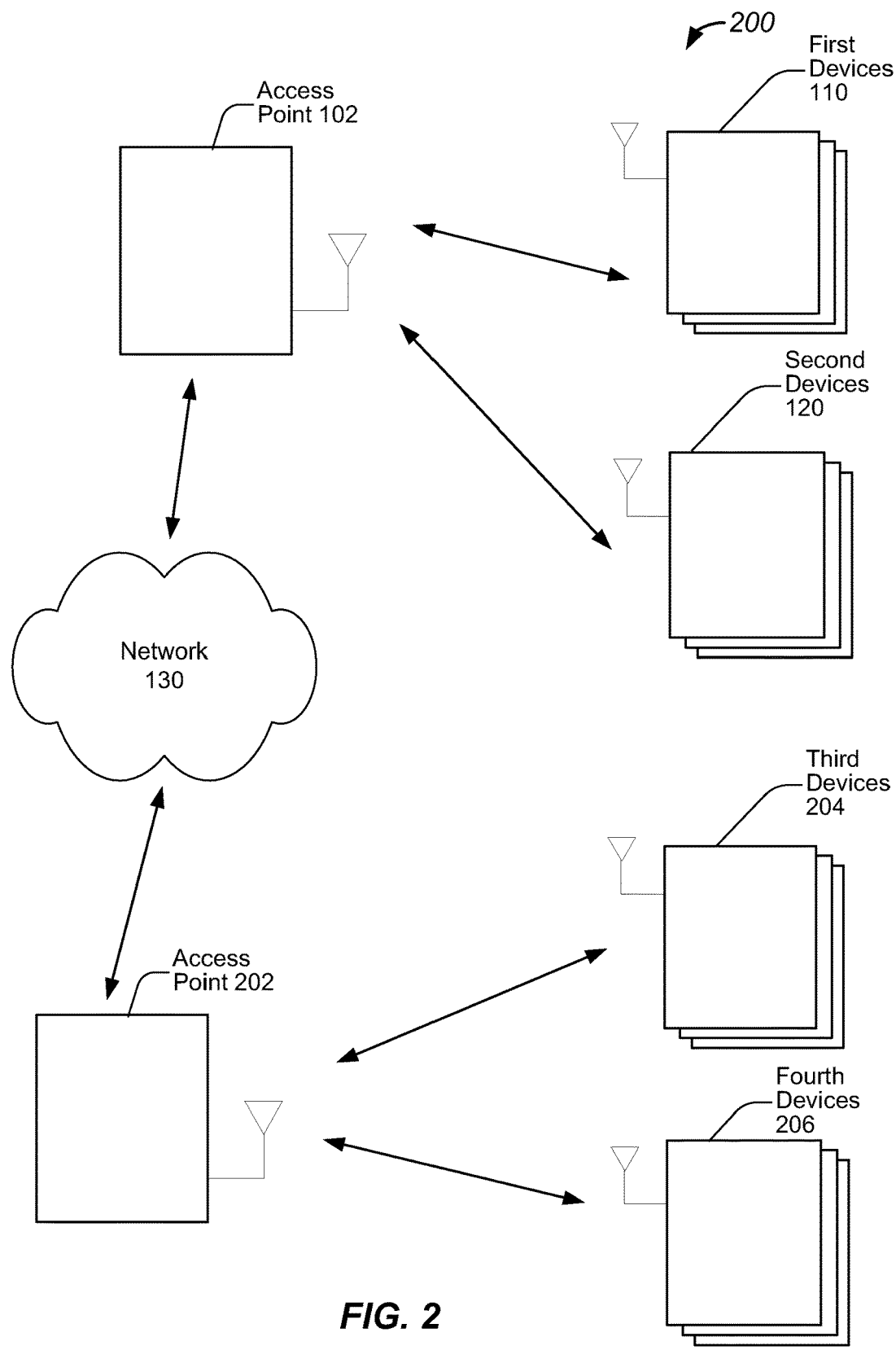
FIG. 2 illustrates a diagram of an example of another system for scheduling requests, configured in accordance with some embodiments.

FIG. 2 illustrates a diagram of an example of another system for scheduling requests, configured in accordance with some embodiments. As similarly discussed above, system 100 may include access point 102, first devices 110 and second devices 120. As also discussed above, access point 102 may be configured to manage communication between first devices 110 and second devices 120, and a communications network, such as network 130.

In various embodiments, system 200 further includes access point 202, third devices 204, and fourth devices 206. As similarly discussed above, access point 202 may be configured to manage communication between third devices 204 and fourth devices 206, and a communications network, such as network 130. Accordingly, as shown in FIG. 2, system 200 may include multiple access points that are coupled with multiple different groups of devices. In this way, various devices may communicate with each other via network 130, and such communication may be managed and scheduled by access points, such as access point 102 and access point 202. In some embodiments, the access points may pass along communications and requests between each other to facilitate the scheduling of network traffic across numerous different devices. For example, access point 202 may schedule requests from first devices 110, second devices 120, third devices 204, and fourth devices 206 where requests and traffic from first devices 110 and second devices 120 are passed along through access point 102.

Figure 3:
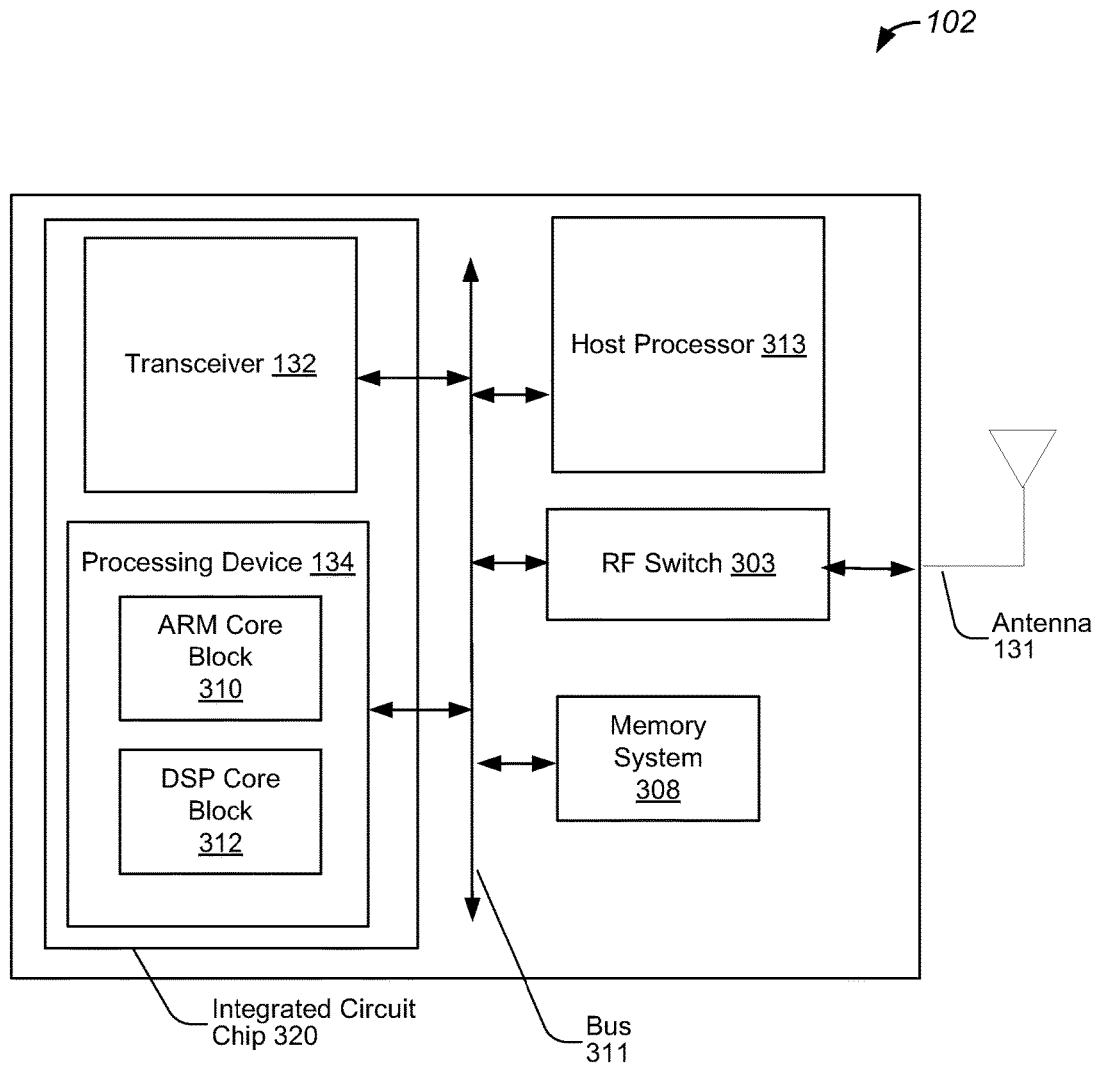
FIG. 3 illustrates a diagram of an example of an access point configured in accordance with some embodiments.

FIG. 3 illustrates a diagram of an example of an access point configured in accordance with some embodiments. Accordingly, FIG. 3 illustrates an example of access point 102 discussed above. As shown in FIG. 3, access point 102 may include various components that are configured to implement the management and scheduling of network traffic discussed above.

Access point 102 includes transceiver 132 which is configured to transmit and receive signals using a communications medium that may include antenna 131. As noted above, transceiver 132 may be included in a WiFi radio, and may be compatible with a WiFi communications protocol. More specifically, transceiver 132 may be compatible with an 802.11ax protocol. Accordingly, transceiver 132 may include components, such as a modulator and demodulator as well as one or more buffers and filters, that are configured to generate and receive signals via antenna 131.

In various embodiments, access point 102 further includes processing device 134 which may include one or more processor cores. In various embodiments, processing device 134 includes one or more processing devices that are configured to implement the scheduling described above and will be described in greater detail below. In some embodiments, processing device 134 is also capable of configuring access point 102 as an access point or as a station. Accordingly, in a SoftAP implementation, the configuration of processing device 134 may determine whether or not a wireless device is an access point or a station. In various embodiments, processing device 134 includes one or more components configured to implement a medium access control (MAC) layer that is configured to control hardware associated with a wireless transmission medium, such as that associated with a WiFi transmission medium. In one example, processing device 134 may include advanced reduced instruction set computing machine (ARM) core block 310 that may be configured to implement a driver, such as a WiFi driver. Processing device 134 may further include digital signal processor (DSP) core block 312 which may be configured to include microcode.

Access point 102 further includes radio frequency (RF) switch 303 which is coupled to antenna 131. While FIG. 3 illustrates access point 102 as having a single antenna, it will be appreciated that access point 102 may have multiple antennas. Accordingly, RF switch 303 may be configured to select an antenna for transmission/reception, and may be configured to provide coupling between the selected antenna, such as antenna 131, and other components of access point 102 via a bus, such as bus 311.

Access point 102 includes memory system 308 which is configured to store one or more data values associated with the traffic scheduling discussed above. Accordingly, memory system 308 includes storage device, which may be a non-volatile random access memory (NVRAM) configured to store such data values, and may also include a cache that is configured to provide a local cache for such traffic scheduling. In various embodiments, access point 102 further includes host processor 313 which is configured to implement processing operations implemented by access point 102.

It will be appreciated that one or more of the above-described components may be implemented on a single chip, or on different chips. For example, transceiver 132 and processing device 134 may be implemented on the same integrated circuit chip, such as integrated circuit chip 320. In another example, transceiver 132 and processing device 134 may each be implemented on their own chip, and thus may be implemented separately.

Figure 4:
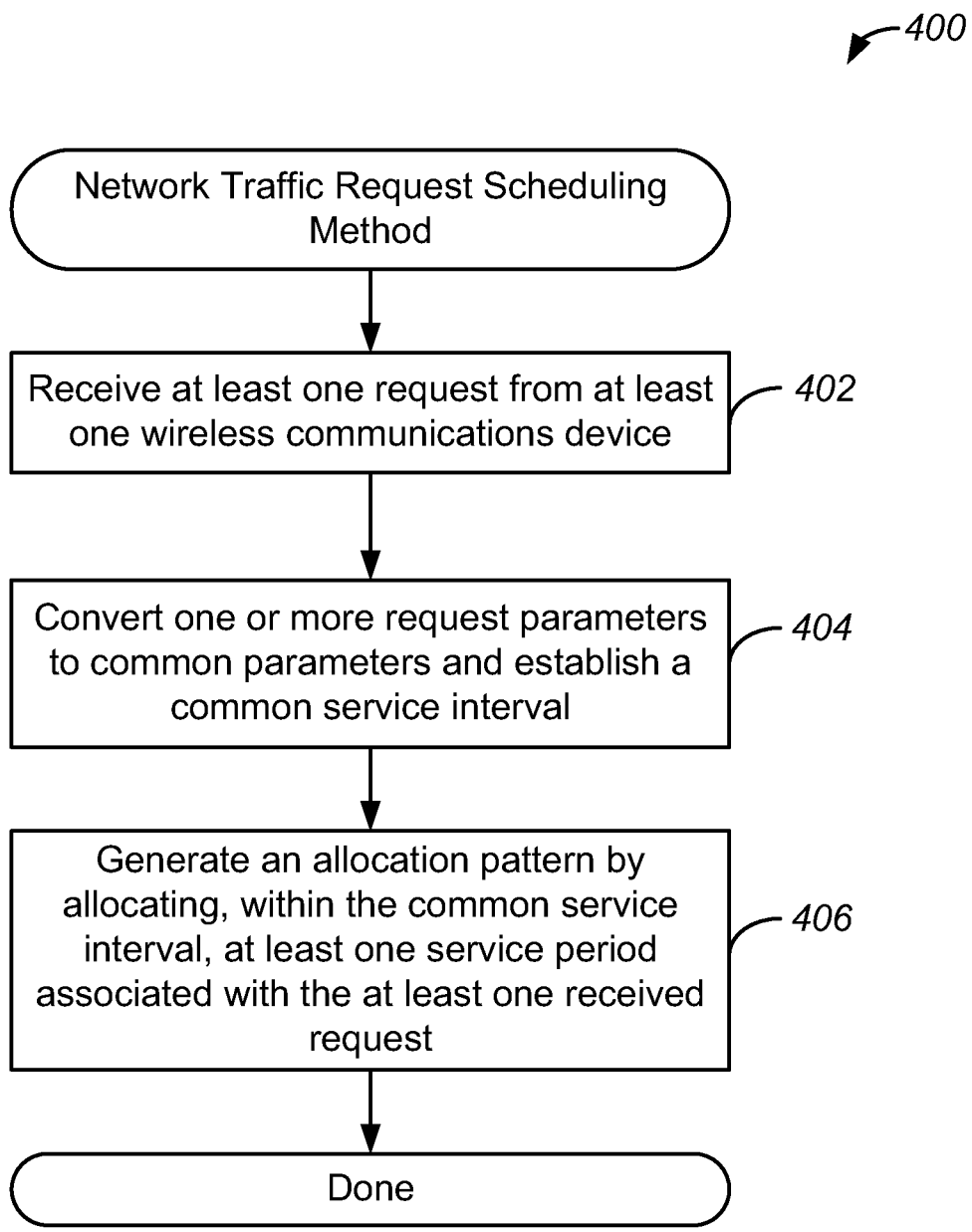
FIG. 4 illustrates a flow chart of an example of a request scheduling method, implemented in accordance with some embodiments.

FIG. 4 illustrates a flow chart of an example of a request schedule method, implemented in accordance with some embodiments. As discussed above, various wireless communications devices may communicate with each other such that an access point establishes and manages connections with various stations. As will be discussed in greater detail below, the access point may be configured to implement one or more novel scheduling techniques to utilize the available communications medium in a manner that accommodates wireless traffic among all of the devices while ensuring that appropriate QoS is provided to all such devices.

Method 400 may commence with operation 402 during which at least one request may be received from a wireless communications device. As discussed above, an access point may be communicatively coupled to various wireless communications devices which may be configured as stations. Accordingly, the access point may receive a request from each of the stations, and each request may be a scheduling request, such as a TWT request, that includes various service parameters. In this way, multiple requests may be received at the access point, and the requests may each have different service parameters associated with such requests.

Method 400 may proceed to operation 404 during which one or more parameters included in the at least one request may be converted to common parameters, and a common service interval may be established. Accordingly, the access point may convert the different parameters to a common referencing system, and may utilize that common referencing system to establish a common service interval. In this way, the access point may examine all of the requests that have been received from different stations, and may determine a common service interval that is capable of accommodating all of the different requests in a manner that ensures that a QoS is provided for each wireless communications device, and subsequent common service intervals will also ensure such a QoS is provided.

Method 400 may then proceed to operation 406 during which an allocation pattern may be generated by allocating, within the common service interval, a service period identified by the at least one request. Accordingly, the access point may allocate service periods within the common service interval such that each service period of each request is allocated within the common service interval. In the example of TWT requests and scheduling, the allocation pattern may determine when wake periods associated with service periods occur for each device within the common service interval.

Figure 5:
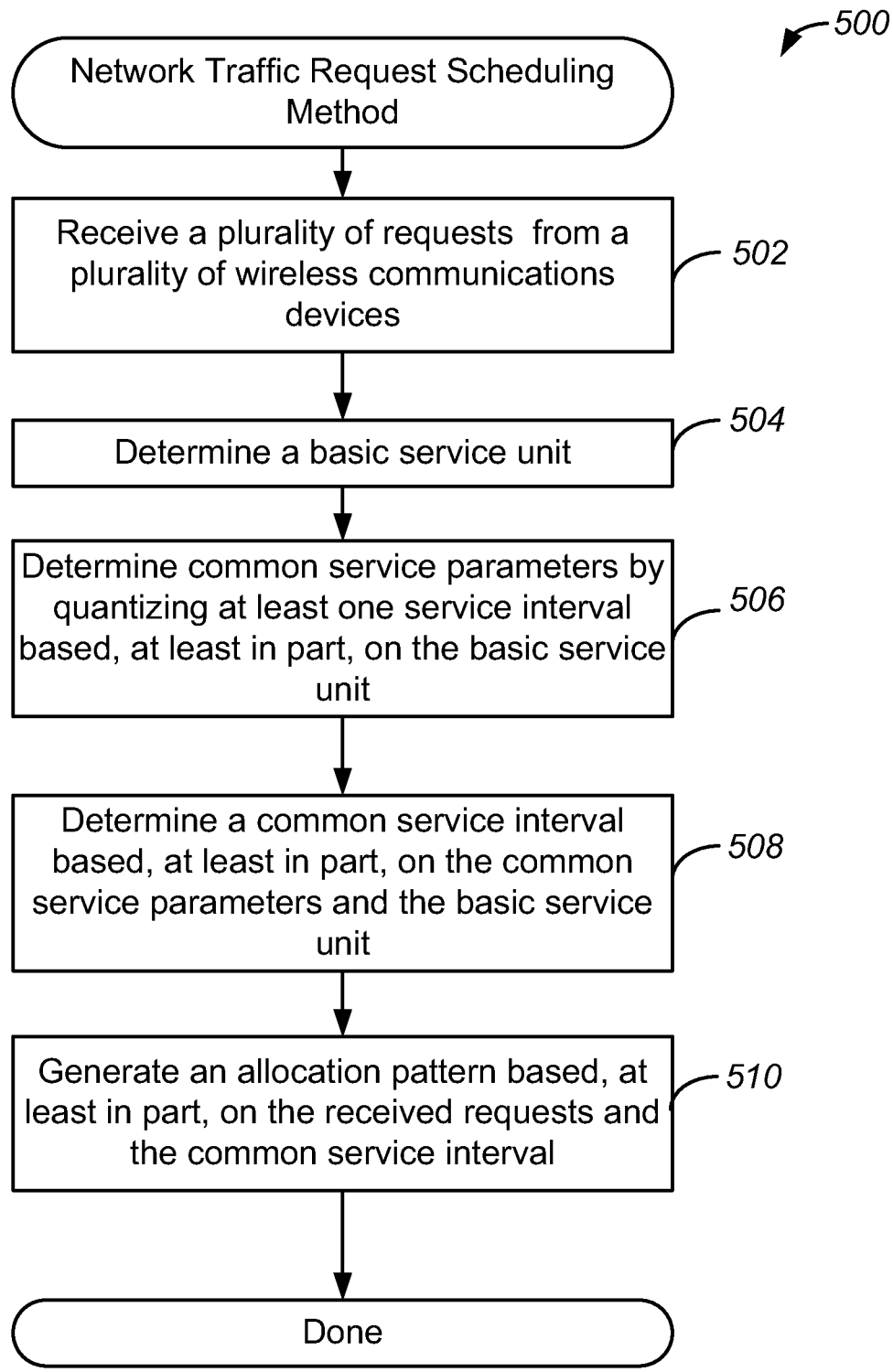
FIG. 5 illustrates a flow chart of another example of a request scheduling method, implemented in accordance with some embodiments.

FIG. 5 illustrates a flow chart of another example of a request schedule method, implemented in accordance with some embodiments. As discussed above, various wireless communications devices may communicate with each other such that an access point establishes and manages connections with various stations. More specifically, the access point is configured to schedule traffic in a manner that accommodates wireless traffic among all of the devices while ensuring that appropriate QoS is provided to all such devices. As will be discussed in greater detail below, the establishing of the common service interval may involve the conversion of raw service parameters in a manner that ensures that the common service interval can accommodate all of the service periods associated with the requests, and prevents overlaps/conflicts in subsequent common service intervals.

Method 500 may commence with operation 502 during which a plurality of requests may be received from a plurality of wireless communications devices. As discussed above, an access point may be communicatively coupled to various wireless communications devices which may be configured as stations. Accordingly, the access point may receive a request from each of the stations, and each request may be a scheduling request, such as a TWT request, that includes various service parameters. As also noted above, such service parameters may include a proposed service period and service interval. The proposed service period and service interval included in the request may be referred to herein as service parameters as well as raw service parameters. Accordingly, the access point may receive numerous different requests from different wireless communications devices, and the different requests may each include different service parameters, such as different proposed service periods and service intervals.

Method 500 may proceed to operation 504 during which a basic service unit may be determined. In various embodiments, the basic service unit may be a designated or default value. For example, the basic service unit may be a unit of time that is used as a time-domain quantization unit, as will be discussed in greater detail below. Accordingly, the basic service unit may be a default value that has been identified and determined previously as a unit of time that is expected to be smaller than all of the service intervals identified by the received requests. During operation 504, the value of the basic service unit may be retrieved.

Method 500 may proceed to operation 506 during which each service interval may be quantized based, at least in part, on the basic service unit. Accordingly, during operation 506, the service intervals may be extracted from the received requests, and each of the service intervals may be divided by the basic service unit. In this way, each of the service intervals may be converted to an integer representation also referred to as a quantization factor. For example, a basic service unit may be 10 milliseconds, and a service interval included in a request may be 12 milliseconds. In this example, the resulting common parameter may be a quantization factor that has an integer value of 1. In another example, the basic service unit may be 10 milliseconds, and a service interval included in a request may be 25 milliseconds. In this example, the resulting common parameter may be a quantization factor that has an integer value of 2. Accordingly, such a quantization process may be implemented for each service interval included in each received request.

Method 500 may proceed to operation 508 during which a common service interval may be determined based, at least in part, on the common parameters and the basic service unit. In various embodiments, the common parameters identifying the quantization factors for all of the received requests may be retrieved, and a least common multiple may be determined based on the common parameters. For example, if common parameters were determined that have quantization factors of {1, 2, 3, 5}, a least common multiple would be determined as 30. The least common multiple may be multiplied by the basic service unit to determine a common service interval. For example, if the basic service interval is 10 milliseconds, as a continuation of the previous example, the common service interval may be 300 milliseconds.

Method 500 may proceed to operation 510 during which an allocation pattern may be generated based, at least in part, on the received requests and the common service interval. Accordingly, during operation 510 the access point may assign service periods of different requests to different time slots of the common service interval. Accordingly, the access point may divide the common service interval into different time slots, and the service periods identified by the requests may be assigned to the time slots in a non-overlapping manner. The service periods may be assigned randomly, or in an order determined by the order in which the requests were received.

Figure 6:
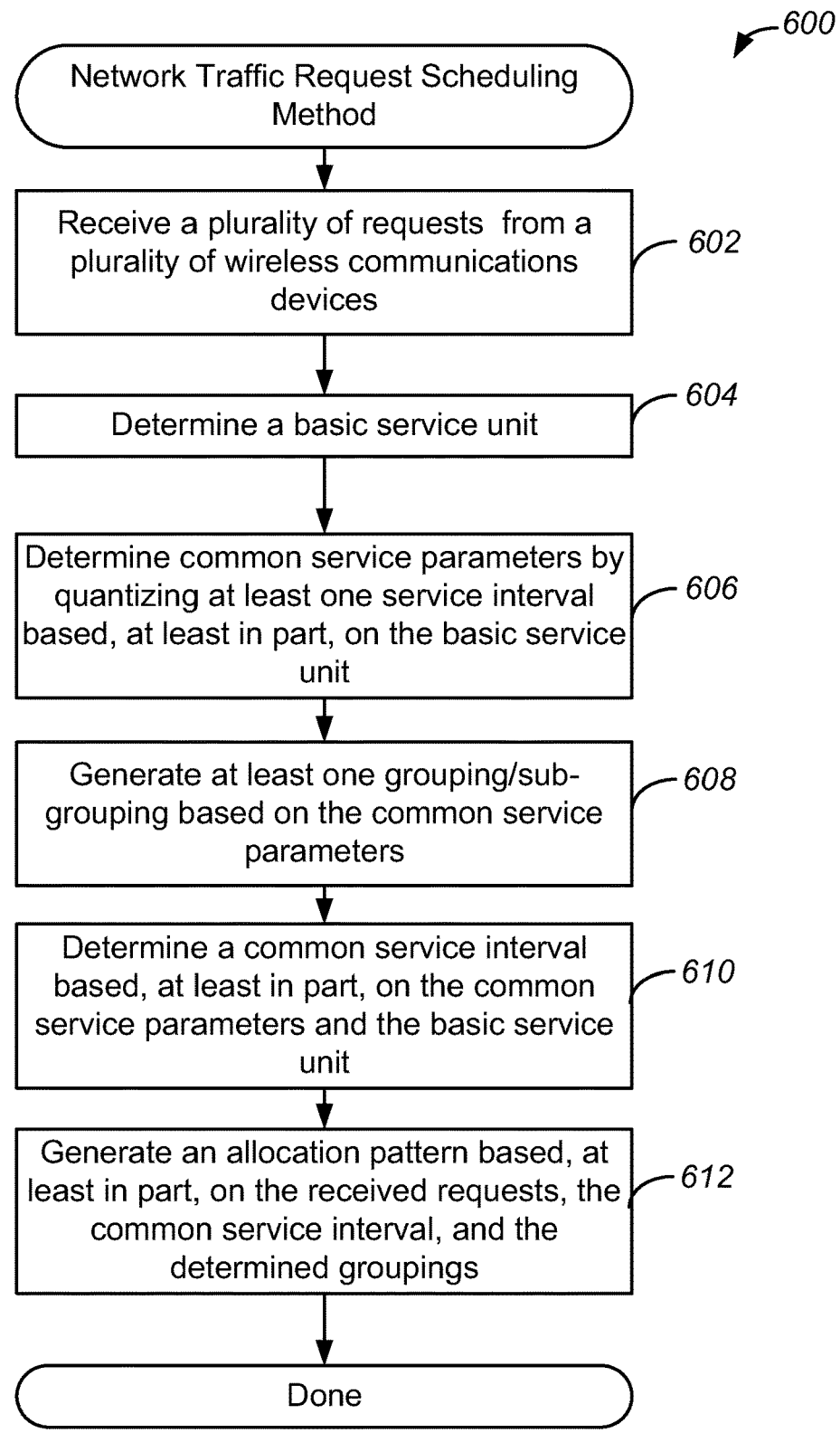
FIG. 6 illustrates a flow chart of yet another example of a request scheduling method, implemented in accordance with some embodiments.

FIG. 6 illustrates a flow chart of yet another example of a request schedule method, implemented in accordance with some embodiments. As discussed above, various wireless communications devices may communicate with each other such that an access point establishes and manages connections with various stations. As previously discussed, the establishing of the common service interval may involve the conversion of raw service parameters in a manner that ensures that the common service interval can accommodate all of the service periods associated with the requests and prevents overlaps/conflicts in subsequent common service intervals. Furthermore, as will be discussed in greater detail below, grouping and subgrouping may be implemented to further enhance the satisfaction of QoS requirements for the various wireless communications devices.

Method 600 may commence with operation 602 during which a plurality of requests may be received from a plurality of wireless communications devices. As discussed above, an access point may be communicatively coupled to various wireless communications devices which may be configured as stations. Accordingly, the access point may receive a request from each of the stations, and each request includes various service parameters. As also noted above, such service parameters may include a proposed service period and service interval. Accordingly, the access point may receive numerous different requests from different wireless communications devices, and the different requests may each include different service parameters, such as different proposed service periods and service intervals.

Method 600 may proceed to operation 604 during which a basic service unit may be determined. As discussed above, the basic service unit may be a designated or default value. Accordingly, the basic service unit may be a default value that has been identified and determined previously as a unit of time that is expected to be smaller than all of the service intervals identified by the received requests. During operation 604, the value of the basic service unit may be retrieved.

Method 600 may proceed to operation 606 during which each service interval may be quantized based, at least in part, on the basic service unit. Accordingly, the service intervals may be extracted from the received requests, and each of the service intervals may be divided by the basic service unit. In this way, each of the service intervals may be converted to an integer representation also referred to as a quantization factor, and such a quantization process may be implemented for each service interval included in each received request.

Method 600 may proceed to operation 608 during which at least one grouping and/or sub-grouping may be generated. In various embodiments, the service periods and service intervals may be grouped based on their determined common parameters. For example, the service periods and service intervals having a quantization factor of 1 may be grouped into a first group, while service periods and service intervals having a quantization factor of 2 may be grouped into a second group. In this way, a plurality of groups may be generated based on the common parameters and quantization factors identified by such common parameters. Additional details will be discussed in greater detail below with reference to FIG. 8.

Method 600 may proceed to operation 610 during which a common service interval may be determined based, at least in part, on the common parameters and the basic service unit. As discussed above, the common parameters identifying the quantization factors for all of the received requests may be retrieved, and a least common multiple may be determined based on the common parameters. The least common multiple may be multiplied by the basic service unit to determine a common service interval.

Method 600 may proceed to operation 612 during which an allocation pattern may be generated based, at least in part, on the received requests, the common service interval, and the determined groupings. Accordingly, during operation 612 the access point may assign service periods of different requests to different time slots of the common service interval. Accordingly, the access point may divide the common service interval into different time slots, and the service periods identified by different requests may be assigned to the time slots in a non-overlapping manner. The service periods may be assigned in a random order, or in an order determined by the order in which the requests were received.

In various embodiments, the assignment of the service periods to the timeslots may be implemented based, at least in part, on the groupings noted above. For example, for a group with a quantization factor F, the service periods included in the group may be alternatively scheduled to timeslots, where such timeslots may be basic service units that are indexed from 0 to F−1. The allocation pattern may repeat every F timeslots until the end of the common service interval. This may be repeated for each grouping that has been determined. Additional details will be illustrated below with reference to FIG. 8. In this way, service periods included in a group may be spread across different common service intervals to increase the overall capacity of the wireless communications medium.

Figure 7:
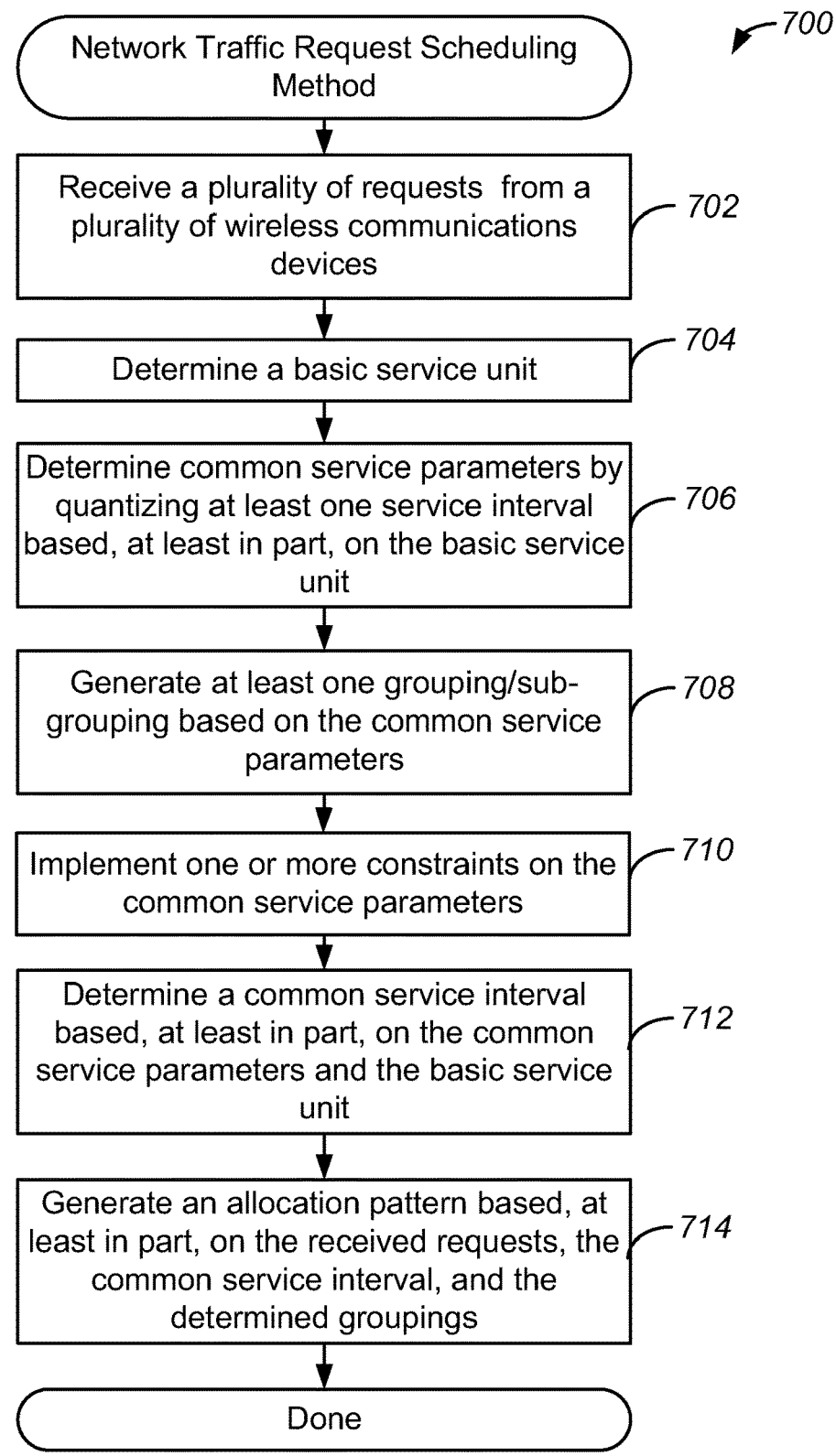
FIG. 7 illustrates a flow chart of an additional example of a request scheduling method, implemented in accordance with some embodiments.

FIG. 7 illustrates a flow chart of an additional example of a request schedule method, implemented in accordance with some embodiments. As discussed above, various wireless communications devices may communicate with each other such that an access point establishes and manages connections with various stations. As previously discussed, the establishing of the common service interval may involve the conversion of raw service parameters in a manner that ensures that the common service interval can accommodate all of the service periods associated with the requests, and prevents overlaps/conflicts in subsequent common service intervals. Furthermore, as will be discussed in greater detail below, constraints on quantization factors may be implemented to further enhance the implementation of scheduling for the various wireless communications devices.

Method 700 may commence with operation 702 during which a plurality of requests may be received from a plurality of wireless communications devices. As discussed above, an access point may be communicatively coupled to various wireless communications devices which may be configured as stations. Accordingly, the access point may receive a request including service parameters from each of the stations. As also noted above, such service parameters may include a proposed service period and service interval.

Method 700 may proceed to operation 704 during which a basic service unit may be determined. As discussed above, the basic service unit may be a designated or default value. Accordingly, the basic service unit may be a default value that has been identified and determined previously as a unit of time that is expected to be smaller than all of the service intervals identified by the received requests. During operation 704, the value of the basic service unit may be retrieved.

Method 700 may proceed to operation 706 during which each service interval may be quantized based, at least in part, on the basic service unit. Accordingly, the service intervals may be extracted from the received requests, and each of the service intervals may be divided by the basic service unit. In this way, each of the service intervals may be converted to an integer representation also referred to as a quantization factor, and such a quantization process may be implemented for each service interval included in each received request.

Method 700 may proceed to operation 708 during which at least one grouping and/or sub-grouping may be generated. In various embodiments, the service periods and service intervals may be grouped based on their determined common parameters. In this way, a plurality of groups may be generated based on the common parameters and quantization factors identified by such common parameters. Additional details will be discussed in greater detail below with reference to FIG. 9.

Method 700 may proceed to operation 710, during which one or more constraints may be implemented with reference to the determination of the common parameters and underlying quantization factors. For example, quantization factors may be determined such that the largest quantization factor is a multiple of the others. As will be discussed in greater detail below, the largest quantization factor becomes the common service interval. For example, the quantization factors determined based on the service intervals included in the requests may be grouped. Such a grouping may result in a set of quantization factors such as $\{1, 2, 3, 5\}$. In various embodiments, this set may be changed to make the largest quantization factor an integer that is a multiple of the others, and larger than its original value. For example, the last quantization factor may be changed such that the set of factors is $\{1, 2, 3, 6\}$. In this way, while a particular service interval of the group with the larger quantization factor may be increased, the overall size of the common service interval is decreased when compared to that determined using a least common multiple technique, as will be discussed in greater detail below.

Method 700 may proceed to operation 712 during which a common service interval may be determined based, at least in part, on the common parameters. As discussed above, the common parameters identifying the quantization factors for all of the received requests may be retrieved. As also noted above, the common parameters may have been constrained such that the largest quantization factor is a multiple of the other quantization factors. Accordingly, the largest quantization factor may be used as the common service interval.

More specifically, the largest quantization factor may be multiplied by the basic service unit to determine the common service interval.

Method 700 may proceed to operation 714 during which an allocation pattern may be generated based, at least in part, on the received requests, the common service interval, and the determined groupings. Accordingly, during operation 714 the access point may assign service periods of different requests to different time slots of the common service interval. Accordingly, the access point may divide the common service interval into different time slots, and the service periods identified by different requests may be assigned to the time slots in a non-overlapping manner. The service periods may be assigned in a random order, or in an order determined by the order in which the requests were received.

As also discussed above, the assignment of the service periods to the timeslots may be alternatively scheduled to timeslots, where such timeslots may be basic service units. The allocation pattern may repeat every F timeslots until the end of the common service interval. This may be repeated for each grouping that has been determined. Additional details will be illustrated below with reference to FIG. 9.

Figure 8:
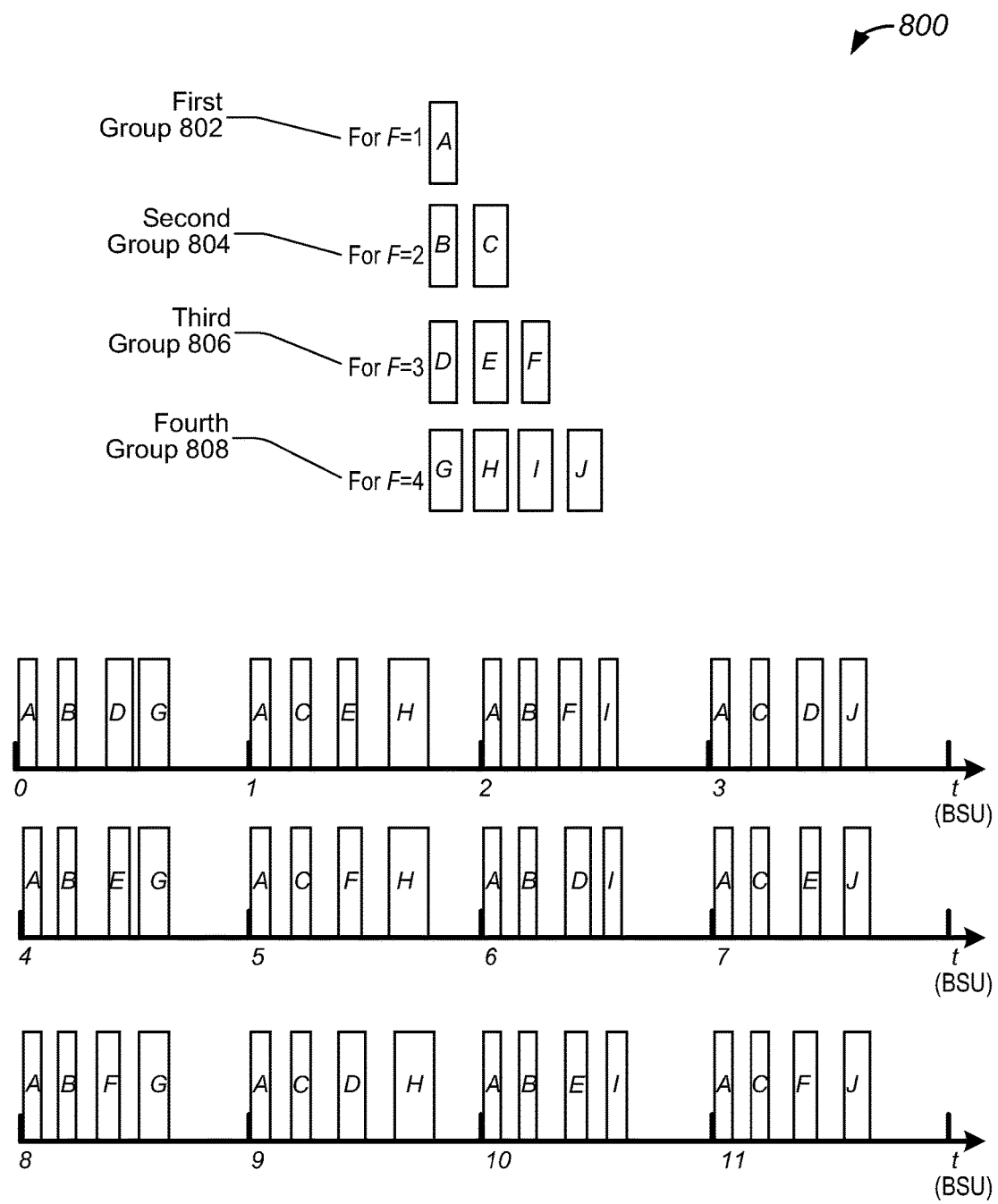
FIG. 8 illustrates an example of an allocation pattern, implemented in accordance with some embodiments.

FIG. 8 illustrates an example of an allocation pattern, implemented in accordance with some embodiments. Accordingly, diagram 800 illustrates a pattern in which a common service interval and associated basic service units are shown over a time course, and labeled along the x-axis. Furthermore, various groupings are shown that each includes different service periods corresponding to different requests having quantization factors (F). For example, first group 802 has a quantization factor of 1, second group 804 has a quantization factor of 2, third group 806 has a quantization factor of 3, and fourth group 808 has a quantization factor of 4. Moreover, each group has particular service periods associated with particular requests. For simplicity, such service periods have been represented as letters. For example, first group 802 includes service period A, second group 804 has service periods B and C, third group 806 has service periods D, E, and F, and fourth group 808 has service periods G, H, I, and J.

As shown in diagram 800, first group 802 only has one associated service period, and may be scheduled into each basic service unit. Meanwhile, second group 804 has two associated service periods which may be alternatively scheduled such that B and C are scheduled every other basic service unit. Furthermore, third group 806 has three associated service periods which may be alternatively scheduled such that D, E, and F are alternated in successive basic service units. Similarly, fourth group 808 has four associated service periods which may be alternatively scheduled such that G, H, I, and J alternated in successive basic service units as shown in diagram 800. In this way, the different service periods of the requests may be spread across different basic service units to increase the overall capacity of the system while still ensuring a QoS for each of the associated wireless communications devices.

Figure 9:
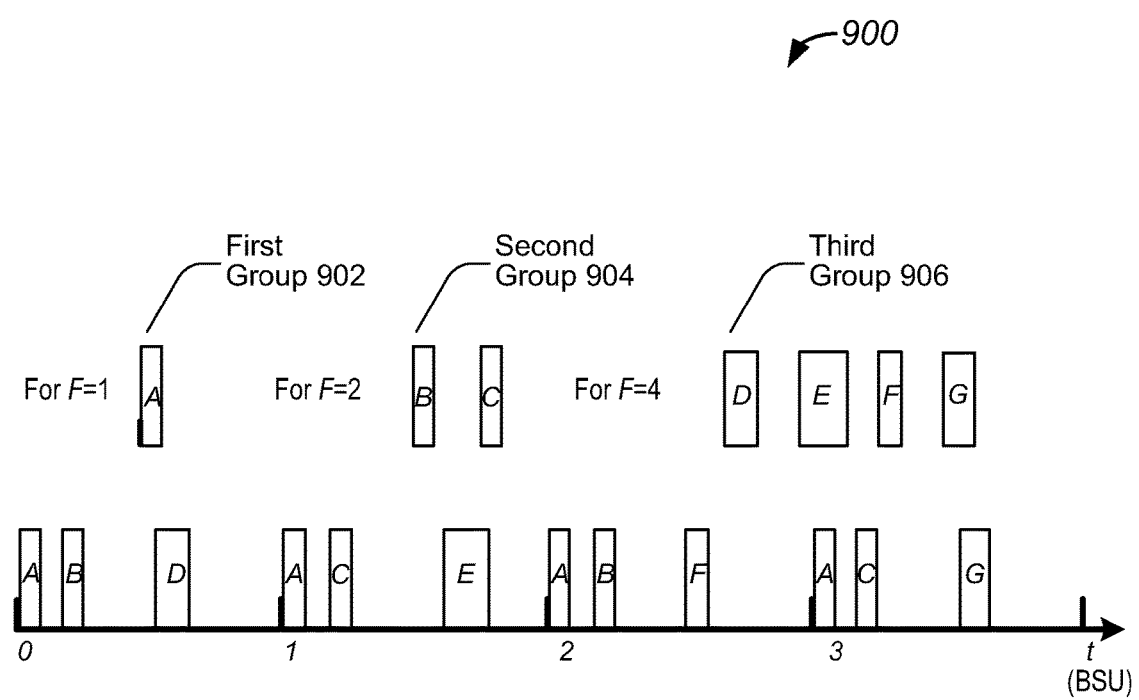
FIG. 9 illustrates another example of an allocation pattern, implemented in accordance with some embodiments.

FIG. 9 illustrates another example of an allocation pattern, implemented in accordance with some embodiments. As similarly discussed above, diagram 900 illustrates a pattern in which a common service interval and associated basic service units are shown over a time course, and labeled along the x-axis, and various groupings are shown each of which includes different service periods corresponding to different requests having quantization factors (F). For example, first group 902 has a quantization factor of 1, second group 904 has a quantization factor of 2, and third group 906 has a quantization factor of 4. Moreover, each group has particular service periods associated with particular requests. For simplicity, such service periods have been represented as letters. For example, first group 902 includes service period A, second group 904 includes service periods B and C, and third group 906 includes service periods D, E, F, and G.

In the example shown in diagram 900, the largest quantization factor 4 has been constrained to be a multiple of the other quantization factors and is used as the common service interval. Diagram 900 further illustrates how grouping may be implemented to spread the service periods across different common service intervals. For example, first group 902 has one associated service period, and may be scheduled each basic service unit. Meanwhile, second group 904 has two associated service periods which may be alternatively scheduled such that B and C are scheduled every other basic service unit. Furthermore, third group 906 has four associated service periods which may be alternatively scheduled such that D, E, F, and G are alternated in successive basic service units.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
 receiving a plurality of requests from a plurality of wireless communications devices that is compatible with an 802.11 transmission protocol, wherein each request of the plurality of requests comprises a proposed service period and proposed service interval;
 generating, using a processing device, a plurality of quantization factors by quantizing the proposed service interval included in each of the plurality of requests;
 determining, using the processing device, a common service interval based, at least in part, on the plurality of quantization factors and a basic service unit; and
 generating, using the processing device, an allocation pattern to allocate the proposed service periods within the common service interval.

2. The method of claim 1, wherein the plurality of requests comprises a plurality of target wake time (TWT) requests.

3. The method of claim 1, wherein the plurality of wireless communications devices is compatible with an 802.11ax transmission protocol.

4. The method of claim 1, wherein the generating of the plurality of quantization factors further comprises:
 determining the basic service unit; and
 dividing each of the proposed service intervals by the basic service unit.

5. The method of claim 4, wherein the determining of the common service interval further comprises:
 identifying a least common multiple of the plurality of quantization factors.

6. The method of claim 5, wherein the determining of the common service interval further comprises:
 multiplying the least common multiple by the basic service unit.

7. The method of claim 4 further comprising:
 generating at least one grouping of requests based on the plurality of quantization factors.

8. The method of claim 4 further comprising:
allocating service periods of the requests included in the at least one grouping, the allocating comprising assigning the service periods to timeslots in alternating basic service units.

9. The method of claim 4 further comprising:
setting a largest quantization factor of the plurality of quantization factors to a least common multiple of other quantization factors of the plurality of quantization factors.

10. A device comprising:
a transceiver configured to be coupled to at least one antenna capable of receiving a plurality of requests from a plurality of wireless communications devices, wherein each request of the plurality of requests comprises a proposed service period and proposed service interval, the transceiver being compatible with an 802.11 transmission protocol; and
a processing device configured to:
generate a plurality of quantization factors by quantizing the proposed service interval included in each of the plurality of requests;
determine a common service interval based, at least in part, on the plurality of quantization factors and a basic service unit; and
generate an allocation pattern to allocate the proposed service periods within the common service interval.

11. The device of claim 10, wherein the 802.11 transmission protocol is an 802.11ax transmission protocol, and wherein the plurality of requests comprises a plurality of target wake time (TWT) requests.

12. The device of claim 10, wherein the generating of the plurality of quantization factors further comprises:
determining the basic service unit; and
dividing each of the proposed service intervals by the basic service unit.

13. The device of claim 12, wherein the determining of the common service interval further comprises:
identifying a least common multiple of the plurality of quantization factors; and
multiplying the least common multiple by the basic service unit.

14. The device of claim 12, wherein the processing device is further configured to:
generate at least one grouping of requests based on the plurality of quantization factors; and
allocate service periods of the requests included in the at least one grouping, the allocating comprising assigning the service periods to timeslots in alternating basic service units.

15. A system comprising:
at least one antenna configured to receive a plurality of requests from a plurality of wireless communications devices that is compatible with an 802.11 transmission protocol, wherein each request of the plurality of requests comprises a proposed service period and proposed service interval;
a host processor;
an integrated circuit chip comprising:
a transceiver coupled to the at least one antenna, the transceiver being compatible with a wireless transmission protocol; and
a processing device configured to:
generate a plurality of quantization factors by quantizing the proposed service interval included in each of the plurality of requests;
determine a common service interval based, at least in part, on the plurality of quantization factors and a basic service unit; and
generate an allocation pattern to allocate the proposed service periods within the common service interval.

16. The system of claim 15, wherein the wireless transmission protocol is an 802.11ax transmission protocol, and wherein the plurality of requests comprises a plurality of target wake time (TWT) requests.

17. The system of claim 15, wherein the generating of the plurality of quantization factors further comprises:
determining the basic service unit; and
dividing each of the proposed service intervals by the basic service unit.

18. The system of claim 17, wherein the determining of the common service interval further comprises:
identifying a least common multiple of the plurality of quantization factors; and
multiplying the least common multiple by the basic service unit.

19. The system of claim 17, wherein the processing device is further configured to:
generate at least one grouping of requests based on the plurality of quantization factors; and
allocate service periods of the requests included in the at least one grouping, the allocating comprising assigning the service periods to timeslots in alternating basic service units.

20. The system of claim 17, wherein the processing device is further configured to:
set a largest quantization factor of the plurality of quantization factors to a least common multiple of other quantization factors of the plurality of quantization factors.

* * * * *